United States Patent [19]
Isobe et al.

[11] Patent Number: 5,130,796
[45] Date of Patent: Jul. 14, 1992

[54] SUBSAMPLE TELEVISION SIGNAL PROCESSING APPARATUS

[75] Inventors: Mitsuo Isobe; Masanori Hamada; Katsumi Morita, all of Osaka, Japan

[73] Assignee: Matsushita Electric Industrial Co., Ltd., Osaka, Japan

[21] Appl. No.: 584,670

[22] Filed: Sep. 19, 1990

[30] Foreign Application Priority Data

Sep. 28, 1989 [JP] Japan .................. 1-253325

[51] Int. Cl.⁵ .......................................... H04N 7/04
[52] U.S. Cl. ................................... 358/138; 358/141
[58] Field of Search ............... 358/141, 133, 138, 142, 358/153, 160

[56] References Cited
U.S. PATENT DOCUMENTS
4,646,135 2/1987 Eichelberger et al. ......... 358/142 X

OTHER PUBLICATIONS

"An HDTV Broadcasting System Utilizing a Bandwidth Compression Technique-Muse" by Y. Ninomiya et al; IEEE Transactions on Broadcasting, vol. BC-33, No. 4, Dec. 4, 1987; pp. 131-159.

"HD-MAC: A Step Forward in the Evolution of Television Technology" by M. J. J. C. Annegarn et al; Philips Tech Rev. 43, No. 8; pp. 197-212.

Primary Examiner—Victor R. Kostak
Attorney, Agent, or Firm—Lowe, Price, LeBlanc & Becker

[57] ABSTRACT

A subsample signal processing apparatus includes a wide-band D/A converter receiving a digital television signal which is compressed in band by subsampling. A signal processor subjects a video signal portion of an output signal from the D/A converter to wide-band processing. The signal processor subjects a sync signal portion of the output signal from the D/A converter to narrow-band processing. An output terminal of the signal processor and an input terminal of a subsequent A/D converter are coupled with wide-band coupling characteristics.

13 Claims, 4 Drawing Sheets

FIG. 6

|  | #1 #12 | #13 | #106 | #107 | #480 |
|---|---|---|---|---|---|
| 1 | | | VITS No. 1 | | Frame Pulse No.1 |
| 2 | | | VITS No. 2 | | Frame Pulse No.2 |
| 3 | | | Audio/Independent data (40 + 4 lines) | | |
| 43 | H D | Signal C | | | |
| 47 | | | | Signal Y (516 lines) | |
| 559 | | Control Signal | | | |
| 563 | | | | Clamping Level 128/256 | |
| 564 | | | Vacant | | |
| 565 | | | Audio/Independent data (40+4 lines) | | |
| 605 | | Signal C | | | |
| 609 | | | | Signal Y (516 lines) | |
| 1121 | | Control Signal | | | |
| 1125 | | | | Clamping Level 128/256 | |

SUBSAMPLE TELEVISION SIGNAL PROCESSING APPARATUS

BACKGROUND OF THE INVENTION

This invention generally relates to a television signal processing apparatus, and particularly relates to an apparatus for processing a television signal via which sample values of a video signal are transmitted as an analog signal.

Subsample television signal processing apparatuses are disclosed in various documents such as "An HDTV Broadcasting System Utilizing a Bandwidth Compression Technique-MUSE", IEEE TRANSACTION ON BROADCASTING, VOL. BC-33, NO. 4, Dec. 1987, and "HD-MAC: A Step Forward in the evolution of television technology", Phillips Technical Review, Vol. 43, No. 8, 1987.

As will be explained later, prior art subsample television signal processing apparatuses have some problems.

SUMMARY OF THE INVENTION

It is an object of this invention to provide an improved television signal processing apparatus.

According to a first aspect of this invention, a subsample signal processing apparatus comprises a wideband D/A converter receiving a digital television signal which is compressed in band by subsampling; first means for subjecting a video signal portion of an output signal from the D/A converter to wide-band processing, and for subjecting a sync signal portion of the output signal from the D/A converter to narrow-band processing; an A/D converter; and second means for coupling an output terminal of the first means and an input terminal of the A/D converter with wide-band coupling characteristics.

According to a second aspect of this invention, a subsample signal processing apparatus comprises a first wide-band D/A converter receiving a digital television signal which is compressed in band by subsampling; an LPF subjecting an output signal from the first D/A converter to narrow-band processing; a digital delay circuit for delaying the digital television signal to compensate a signal delay caused by the LPF; a second wide-band D/A converter receiving an output signal from the digital delay circuit; means for selecting an output signal from the LPF during a sync signal period of the digital television signal, and for selecting an output signal from the second D/A converter during a video signal period of the digital television signal; an A/D converter; and means for coupling an output terminal of the selecting means and an input terminal of the A/D converter with wide-band coupling characteristics.

According to a third aspect of this invention, an apparatus for processing a digital television signal which is compressed in band by subsampling comprises a D/A converter converting the digital television signal into a corresponding analog signal; an LPF processing the analog signal; an A/D converter; means for detecting whether or not the digital television signal currently corresponds to a video signal period where the digital television signal represents display information; and means for enabling the analog signal to bypass the LPF and transmitting the analog signal from the D/A converter directly to the A/D converter when the detecting means detects that the digital television signal currently corresponds to the video signal period, and for enabling the analog signal to be processed by the LPF and transmitting an output signal from the LPF to the A/D converter when the detecting means detects that the digital television signal does not currently correspond to the video signal period.

BRIEF DESCRIPTION OF THE DRAWINGS

FIG. 6 is a diagram showing the format of transmission of a MUSE signal.

DESCRIPTION OF THE PRIOR ART

Figure 1:
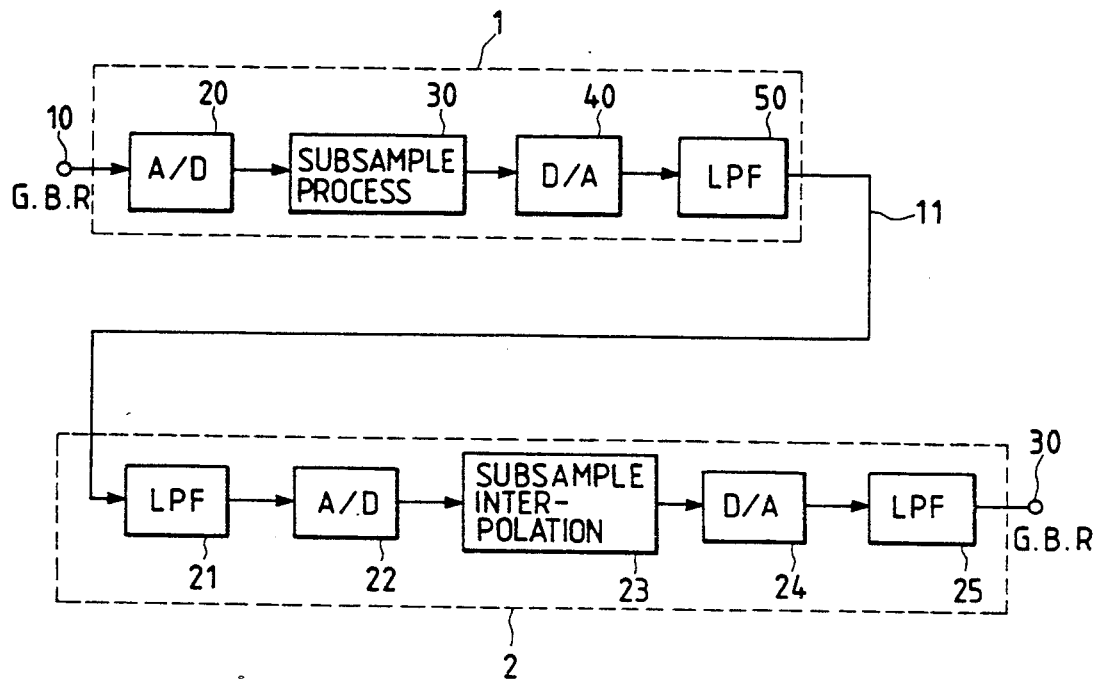
FIG. 1 is a block diagram of a first prior art subsample television signal processing apparatus.

FIG. 1 shows a prior art subsample television signal processing apparatus. In the prior art apparatus of FIG. 1, a transmitter includes a MUSE (Multiple Sub-Nyquist Sampling Encoding) encloder 1 fed via a signal input terminal 10 with three primary color (G, B, and R) HDTV (Hi-Vision) signals. The MUSE encoder 1 has an A/D (analog-to-digital) converter, a subsample processing circuit 30, a D/A (digital-to-analog) converter 40, and an LPF (low pass filter) 50.

The input color HDTV (Hi-Vision) signals are digitized by the A/D converter 20. The output digital signals from the A/D converter 20 are subjected to multiple subsampling by the subsample processing circuit 30, so that they are compressed in band and are converted into a digital MUSE signal having a baseband signal bandwidth of about 8 MHz. The digital MUSE signal is converted into a corresponding analog MUSE signal via the D/A converter 40 and the LPF 50. The analog MUSE signal is outputted to a transmission line 11 including leading wires.

In the case where the analog MUSE signal is used for satellite broadcast, some devices such as a preemphasis circuit and a frequency modulator are added for deriving frequency-modulated waves from the analog MUSE signal.

In the prior art apparatus of FIG. 1, a receiver includes a MUSE decoder 2 receiving the analog MUSE signal transmitted via the transmission line 11. The MUSE decoder 2 has an LPF 21, an A/D converter 22, a subsample interpolation circuit 23, a D/A converter 24, and an LPF 25. The received analog MUSE signal is passed through the LPF 21 to the A/D converter 22. The analog MUSE signal is re-sampled and is converted into a corresponding digital MUSE signal by the A/D converter 22. The subsample interpolation circuit 23 subjects the digital MUSE signal to given signal processing for bandwidth expansion. The subsample interpolation circuit 23 outputs three digital signals which correspond to three colors respectively. The D/A converter 24 converts the digital output signals from the subsample interpolation circuit 23 into three original primary color hi-vision signals. In this way, original color hi-vision signals are recovered from the digital MUSE signal. The recovered color hi-vision signals are fed to an output terminal 30 via the LPF 25.

In the prior art apparatus of FIG. 1, the signal transmission part from the D/A converter 40 to the A/D converter 22 is required to well satisfy prescribed -6-dB 10% cosine roll-off characteristics at 8.1 MHz. When this requirement is met, the output signal from A/D converter 22 is essentially equal to the input signal to the D/A converter 40 so that any distortion is substantially absent during the signal transmission.

As will be explained later, in some cases, a signal processing circuit including A/D and D/A converters is newly added in the transmission line 11.

In the case where the transmission line 11 is a satellite broadcast system, it is necessary that the MUSE signal is made into a form which suits to frequency modulation. Therefore, preemphasis processing and deemphasis processing are necessary in the encoder 1 and the decoder 2 respectively. The preemphasis processing and the deemphasis processing are generally executed by a digital signal processing technique since analog signal processing tends to be inadequate for a high accuracy.

Figure 2:
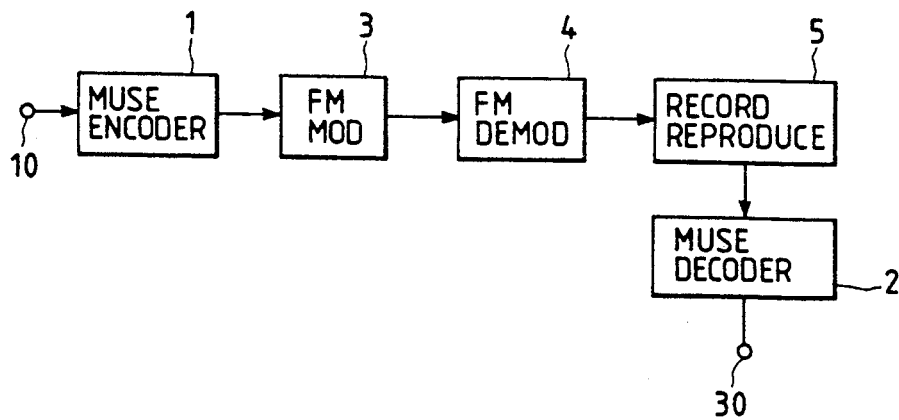
FIG. 2 is a block diagram of a second prior art subsample television signal processing apparatus.

FIG. 2 shows a prior art apparatus in which a satellite broadcast signal is received via an FM (frequency modulation) demodulator 4 and the received signal is recorded and reproduced in a MUSE signal form by a recording and reproducing device 5, and the reproduced signal is subjected to bandwidth expansion by a MUSE decoder 2. In the prior art apparatus of FIG. 2, after the received MUSE signal is converted by an A/D converter into a corresponding digital MUSE signal and then the digital MUSE signal is further converted through deemphasis processing into a desired form, the desired-form signal is recorded and reproduced by the recording and reproducing device 5.

In the case where the recording and reproducing device 5 is of the analog recording type, a D/A converter is generally added to the part following the stage executing the deemphasis processing, and the digital MUSE signal is converted by the D/A converter back into an analog MUSE signal which is recorded and reproduced by the recording and reproducing device 5. In this case, the MUSE decoder 2 is fed with the reproduced analog signal from the recording and reproducing device 5.

In the case where the recording and reproducing device 5 is of the digital recording type, the digital MUSE signal is subjected to deemphasis processing before being recorded and reproduced by the recording and reproducing device 5. It is generally desired that the reproduced digital signal can be fed from the recording and reproducing device 5 to the MUSE decoder 2 via only a single connecting line.

Figure 3:
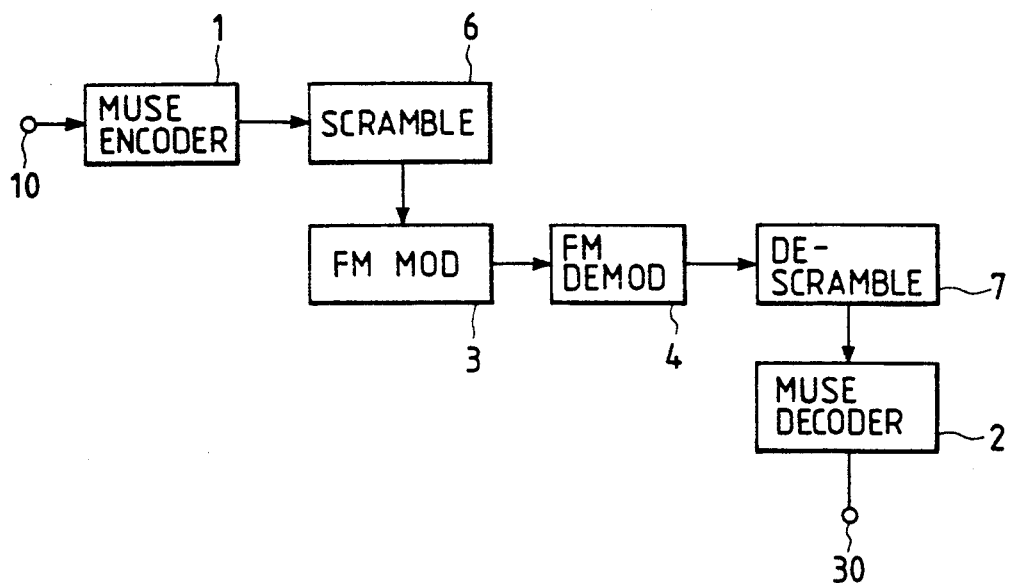
FIG. 3 is a block diagram of a third prior art subsample television signal processing apparatus.

FIG. 3 shows a prior art apparatus which can be applied to subscription satellite broadcast. In the prior art apparatus of FIg. 3, a transmitter side includes a scrambler 6 subjecting a video signal to a scrambling process while a receiver side includes a descrambler 7 which decodes the scrambled signal into a MUSE signal fed to a MUSE decoder 2. The scrambling process and the descrambling process are generally executed by digital signal processing techniques. In addition, it is generally desired that the MUSE signal can be fed from the descrambler 7 to the MUSE decoder 2 via only a single connecting line.

In the prior art apparatuses of FIGS. 2 and 3, A/D conversion and D/A conversion are performed at a plurality of stages. As described previously, it is necessary for each of the related A/D and D/A converters to satisfy the prescribed cosine roll-off characteristics to prevent a deterioration of the signal quality. Especially, in the case where analog LPFs are additionally provided at a plurality of stages, the characteristics of each of the LPFs are required to be maintained precisely so that a problem tends to occur in cost. When the maintenace of the characteristics of each of the LPFs is inadequate, the sample value signal tends to be contaminated by distortion during the analog transmission. In this case, ringing tends to occur at outline parts in a reproduced image due to interference between the sample values. In addition, coupling the band expansion decoder to the recording and reproducing device or the descrambler via the single digital-signal line requires PCM encoder and decoder, and there occurs a problem in cost.

DESCRIPTION OF THE FIRST PREFERRED EMBODIMENT

Figure 4:
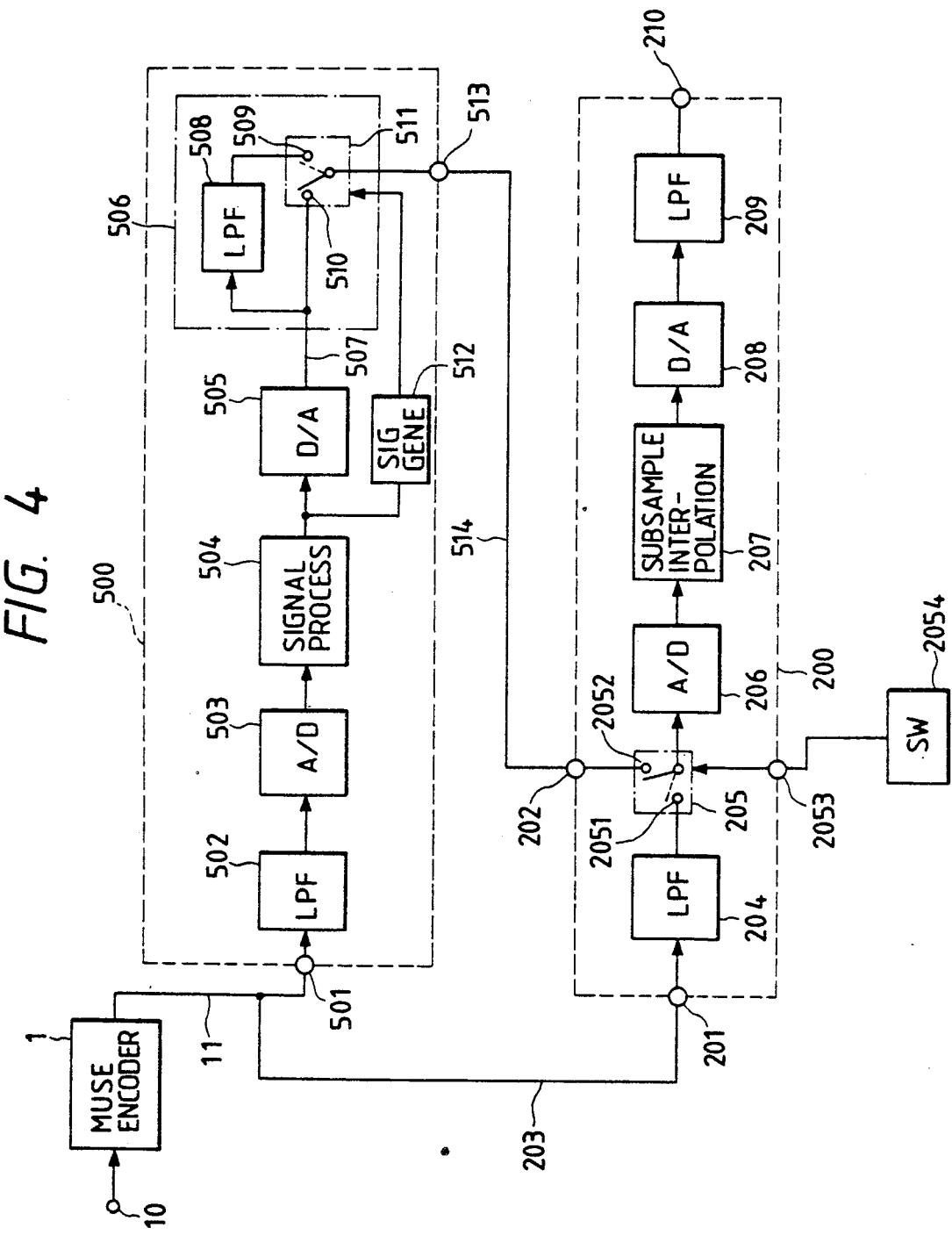
FIG. 4 is a block diagram of a subsample television signal processing apparatus according to a first embodiment of this invention.

With reference to FIG. 4, a MUSE encoder 1 outputs an analog MUSE signal to an input terminal 501 of a first MUSE signal processing device 500 via a transmission line 11. The first MUSE signal processing device 500 includes an analog LPF 502, and A/D converter 503, a first signal processing circuit 504, a D/A converter 505, and a second signal processing circuit 506.

The input analog MUSE signal is fed to the A/D converter 503 via the analog LPF 502. The analog MUSE signal is converted by the A/D converter 503 into a corresponding digital MUSE signal. The analog LPF 502 and the A/D converter 503 have frequency characteristics necessary to meet prescribed 10% cosine roll-off characteristics in conjunction with the D/A converter 505 and an analog LPF which will be explained later. The presecribed cosine roll-off characteristics agree with conditions for essentially distortion-free processing of a MUSE video signal. Therefore, the digital MUSE signal outputted from the A/D converter 503 is essentially free from any distortion.

The first signal processing circuit 504 receives the digital MUSE signal from the A/D converter 503. The first signal processing circuit 504 includes a recording and reproducing device which records and reproduces the digital MUSE signal into and from an internal recording medium. The first signal processing circuit 504 may additionally include a deemphasis circuit. The first signal processing circuit 504 may include a descramble circuit. The first signal processing circuit 504 outputs the reproduced digital MUSE signal. The quality of the output digital MUSE signal from the first signal processing circuit 504 is essentially the same as the quality of the digital MUSE signal inputted into the first signal processing circuit 504.

It is preferable that the first signal processing circuit 504 processes the digital MUSE signal while maintaining its digital signal form. The first signal processing circuit 504 may be of other types. Specifically, in one example of the other types of the first signal processing circuit 504, the digital MUSE signal fed from the A/D converter 503 is converted into an analog signal form which is recorded into an internal recording medium, and the analog signal is reproduced from the recording medium before being converted back into a digital signal form. In this case, the first signal processing circuit 504 is generally required to have wide-band transmission characteristics which essentially prevent a frequency-dependent deterioration of the quality of the MUSE signal.

In the case where the digital MUSE signal originates from a satellite broadcast signal exposed to a non-linear preemphasis process, it is preferable that a deemphasis process is made on the digital MUSE signal regardless of whether the first signal processing circuit 504 is of the digital recording type or the analog recording type. The preemphasis process and the deemphasis process enable a reduction in the total amount of the transmitted information for the digital recording, and enables an increase in S/N ratio for the analog recording.

The D/A converter 505 receives the digital MUSE signal from the first signal processing circuit 504. The digital MUSE signal received by the D/A converter 505 has a parallel form having, for example, 8 to 10 bits. The digital MUSE signal is converted by the D/A converter 505 into a corresponding analog MUSE signal. Specifically, the digital MUSE signal is subjected by the D/A converter 505 to wide-band D/A conversion which executes only weighted addition of the parallel-form MUSE signal. The output MUSE signal from the D/A converter 505 is fed to the second signal processing circuit 506 via a leading line 507.

The second signal processing circuit 506 includes an analog LPF 505 and a signal selection circuit 511. The analog LPF 508 subjects the output MUSE signal from the D/A converter 505 to narrow-band signal processing to remove unnecessary noise components from the MUSE signal. The output MUSE signal from the analog LPF 508 is essentially equal in waveform to the analog MUSE signal fed to the input terminal 501 of the first MUSE signal processing device 500. The signal selection circuit 511 has input terminals 509 and 510 receiving the output signals from the analog LPF 508 and the D/A converter 505 respectively. The signal selection circuit 511 selects one of the output signals from the analog LPF 508 and tha D/A converter 505 and passes the selected in response to a control signal fed from a control signal generator 512 within the first MUSE signal processing device 500.

The control signal generator 512 generates the control signal on the basis of a vertical sync signal and a horizontal sync signal contained in the output signal from the first signal processing circuit 504. The control signal is a binary signal dependent on whether or not the current signal part corresponds to a video signal period, that is, whether or not the current signal part represents video information (display information). During each video signal period, the signal selection circuit 511 selects and passes the output signal from the D/A converter 505 in response to the control signal. In this case, the analog LPF 508 is bypassed or disabled. During other periods such as a period where a sync signal occurs, the signal selection circuit 511 selects and passes the output signal from the analog LPF 508 in response to the control signal. In this case, the analog LPF 508 is enabled. As a result of the previously-mentioned operation of the signal selection circuit 511, the output signals from the D/A converter 505 and the analog LPF 508 are multiplexed in a time division manner. The signal selection circuit 511 feeds the resultant multiplexed signal to an output terminal 513 of the first MUSE signal processing device 500. In summary, during each video signal period, the analog signal which results from the wide-band D/A conversion is output via the output terminal 513. During other periods such as a period where a sync signal occurs, the analog MUSE signal which has the waveform essentially same as the waveform of the input MUSE signal is outputted via the output terminal 513.

A second MUSE signal processing device 200 constitutes a MUSE decoder and includes a first input terminal 201 and second input terminal 202. In addition, the second MUSE signal processing device 200 includes an analog LPF 204, a signal selection circuit 205, an A/D converter 206, a subsample interpolation circuit 207, a D/A converter 208, and an analog LPF 209. The first input terminal 201 is directly fed with the analog MUSE signal from the MUSE encoder 1 via a leading line 203. The input analog MUST signal is transmitted via the analog LPF 204 to a first input terminal 2051 of the signal selection circuit 205. The analog LPF 204 has characteristics equal to the characteristics of the analog LPF 502 in the first MUSE signal processing device 500. A second input terminal 2052 of the signal selection circuit 205 receives the output signal from the first MUSE signal processing device 500 via a leading line 514 and the input terminal 202 of the second MUSE signal processing device 200. The signal selection circuit 205 selects one of the output analog MUSE signals from the analog LPF 204 and the first MUSE signal processing device 500 and passes the selected signal in response to a control signal fed from a manual switch 2054 via a control terminal 2053.

The output analog MUSE signal from the signal selection circuit 205 is applied to the A/D converter 206. The analog MUSE signal is re-sampled and is converted into a corresponding digital MUSE signal by the A/D converter 206. The subsample interpolation circuit 207 subjects the digital MUSE signal to given signal processing for bandwidth expansion. The D/A converter 208 and the analog LPF 209 which follow the subsample interpolation circuit 207 recover an analog hi-vision signal from the output signal of the subsample interpolation cirucit 207. The analog hi-vision signal is transmitted via an output terminal 210 of the second MUSE signal processing device 200.

In the case where the manual switch 2054 is operated so that the signal selected circuit 205 selects the output signal from the analog LPF 204 and passes the selected signal to the A/D converter 206, the output signal from the analog LPF 204 is converted by the A/D converter 206 into the corresponding digital signal.

In the case where the manual switch 2054 is operated so that the signal selection circuit 205 selects the output signal from the first MUSE signal processing device 500 and passes the selected signal to the A/D converter 206, the A/D converter 206 and the D/A converter 505 of the first MUSE signal processing device 500 are coupled via single connecting line. In addition, during each video signal period, the A/D converter 206 and the D/A converter 505 are coupled in a wide-band manner or the analog LPF 508 is bypassed. Accordingly, in this case, the output digital MUSE signal from the A/D converter 208 is essentially free from any quality deterioration due to interference between sample values so that the recovered hi-vision signal transmitted via the output terminal 210 is prevented from being contaminated by ringing distortion. During periods other than the video signal periods, the analog LPF 508 is enabled so that the output analog MUSE signal from the first MUSE signal processing device 500 is essentially equal in waveform to the analog MUSE signal inputted into the first MUSE signal processing device 500.

As described previously, the control signal generator 512 generates the selection control signal on the basis of a vertical sync signal and a horizontal sync signal contained in the output signal from the first signal processing circuit 504. FIG. 6 shows the format of transmission of a MUSE signal in a vertical-horizontal two-dimensional expression. As described previously, the selection control signal generated by the control signal generator 512 is binary, being changeable between first and second predetermined states having different levels respectively. For example, during each video signal period where the current signal part represents video information (display information) including a color signal C and a luminance signal Y (see FIG. 6), the selection control signal is in the first state. During other periods including periods where the current signal part represents a horizontal sync signal HD (see FIG. 6), the selection control signal is in the second state.

The control signal generator 512 can be a combination of a horizontal sync detector and a constant-width pulse generator. The horizontal sync detector senses each horizontal sync signal HD in the output signal from the first signal processing circuit 504. The pulse generator periodically generates a pulse of a predetermined width in response to the output signal from the horizontal sync detector, the pulse occurring for the period where the current signal part represents a horizontal sync signal HD (see FIG. 6).

DESCRIPTION OF THE SECOND PREFERRED EMBODIMENT

Figure 5:
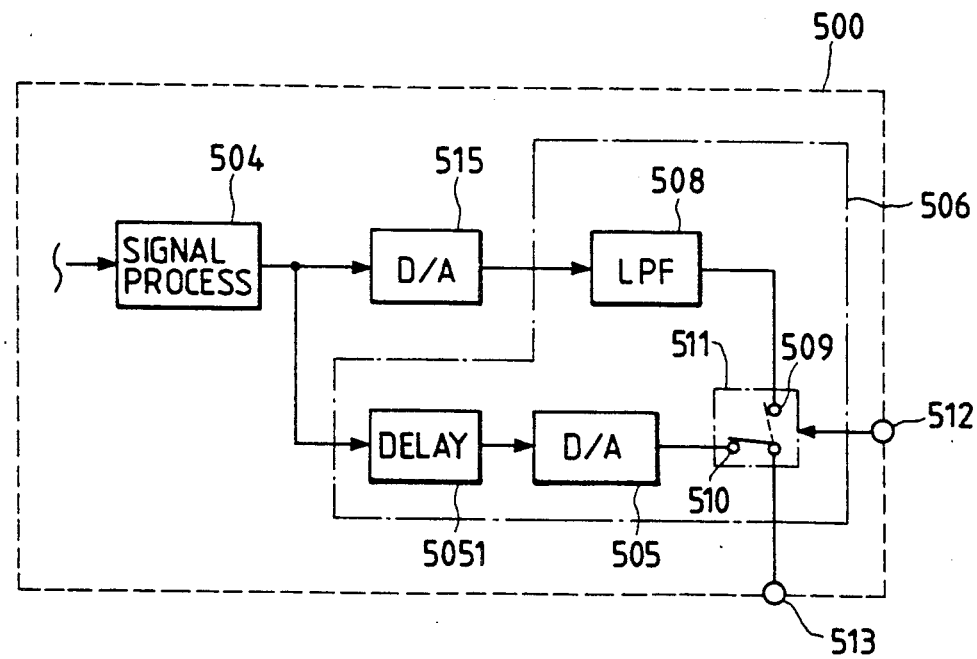
FIG. 5 is a block diagram of a portion of a subsample television signal processing apparatus according to a second embodiment of this invention.

FIG. 5 shows a second embodiment of this invention which is similar to the embodiment of FIG. 4 except for the following design change. In the embodiment of FIG. 5, a second signal processing circuit 506 in a first MUSE signal processing device 500 includes a D/A converter 505, an analog LPF 508, a signal selection circuit 511, and a digital delay circuit 5051. The output digital signal from a first signal processing circuit 504 is converted by the D/A converter 515 into a corresponding analog signal. The output analog signal from the D/A converter 515 is fed to a first input terminal 509 of the signal selection circuit 511 via the analog LPF 508. The output digital signal from the first signal processing circuit 504 is fed to the D/A converter 505 via the delay circuit 5051, and is converted by the D/A converter 505 into a corresponding analog signal. The output analog signal from the D/A converter 505 is applied to a second input terminal 510 of the signal selection circuit 511. The delay circuit 5051 compensates for a time difference between video signal components and other signal components which is caused by a signal delay effect of the analog LPF 508.

What is claimed is:

1. A subsample signal processing apparatus comprising:
    a wide-band D/A converter receiving a digital television signal which is compressed in band by subsampling;
    first means for subjecting a video signal portion of an output signal from the D/A converter to wide-band processing, and for subjecting a sync signal portion of the output signal from the D/A converter to narrow-band processing;
    an A/D converter; and
    second means for coupling an output terminal of the first means and an input terminal of the A/D converter, said second means having wide-band coupling characteristics.

2. The subsample signal processing apparatus of claim 1 further comprising a second A/D converter converting an analog television signal into a corresponding digital signal, and a signal processing circuit processing the digital signal from the second A/D converter into the digital television signal.

3. The subsample signal processing apparatus of claim 2 wherein the analog television signal is of a MUSE type.

4. The subsample signal processing apparatus of claim 2 wherein the signal processing circuit comprises a deemphasis circuit and a recording and reproducing device.

5. The subsample signal processing apparatus of claim 2 wherein the signal processing circuit comprises a descramble circuit.

6. The subsample signal processing apparatus of claim 1 wherein the first means comprises a LPF for subjecting the sync signal portion of the output signal from the D/A converter to the narrow-band processing to remove noise components caused by the wide-band D/A converter.

7. A subsample signal processing apparatus comprising:
    a first wide-band D/A converter receiving a digital television signal which is compressed in band by subsampling;
    an LPF subjecting an output signal from the first D/A converter to narrow-band processing;
    a digital delay circuit for delaying the digital television signal to compensate a signal delay caused by the LPF;
    a second wide-band D/A converter receiving an output signal from the digital delay circuit;
    means for selecting an output signal from the LPF during a sync signal period of the digital television signal, and for selecting an output signal from the second D/A converter during a video signal period of the digital television signal;
    an A/D converter; and
    means for coupling an output terminal of the selecting means and an input terminal of the A/D converter with wide-band coupling characteristics.

8. The subsample signal processing apparatus of claim 7 further comprising a second A/D converter converting an analog television signal into a corresponding digital signal, and a signal processing circuit processing the digital signal from the second A/D converter into the digital television signal.

9. The subsample signal processing apparatus of claim 8 wherein the analog television signal is of a MUSE type.

10. The subsample signal processing apparatus of claim 8 wherein the signal processing circuit comprises a deemphasis circuit and a recording and reproducing device.

11. The subsample signal processing apparatus of claim 8 wherein the signal processing circuit comprises a descramble circuit.

12. The subsample signal processing apparatus of claim 7 wherein the first means comprises a LPF for subjecting the sync signal portion of the output signal from the D/A converter to the narrow-band processing to remove noise components caused by the wide-band D/A converter.

13. An apparatus for processing a digital television signal which is compressed in band by subsampling, comprising:
- a D/A converter converting the digital television signal into a corresponding analog signal;
- an LPF processing the analog signal;
- an A/D converter;
- means for detecting whether or not the digital television signal currently corresponding to a video signal period where the digital television signal represents display information; and
- means for enabling the analog signal to bypass the LPF and transmitting the analog signal from the D/A converter directly to the A/D converter when the detecting means detects that the digital television signal currently corresponds to the video signal period, and for enabling the analog signal to be processed by the LPF and transmitting an output signal from the LPF to the A/D converter when the detecting means detects that the digital television signal does not currently correspond to the video signal period.

* * * * *